Oct. 10, 1939.  F. S. HODGMAN  2,175,800
ELECTROHYDRAULIC STEERING GEAR
Original Filed Jan. 14, 1937   2 Sheets-Sheet 1
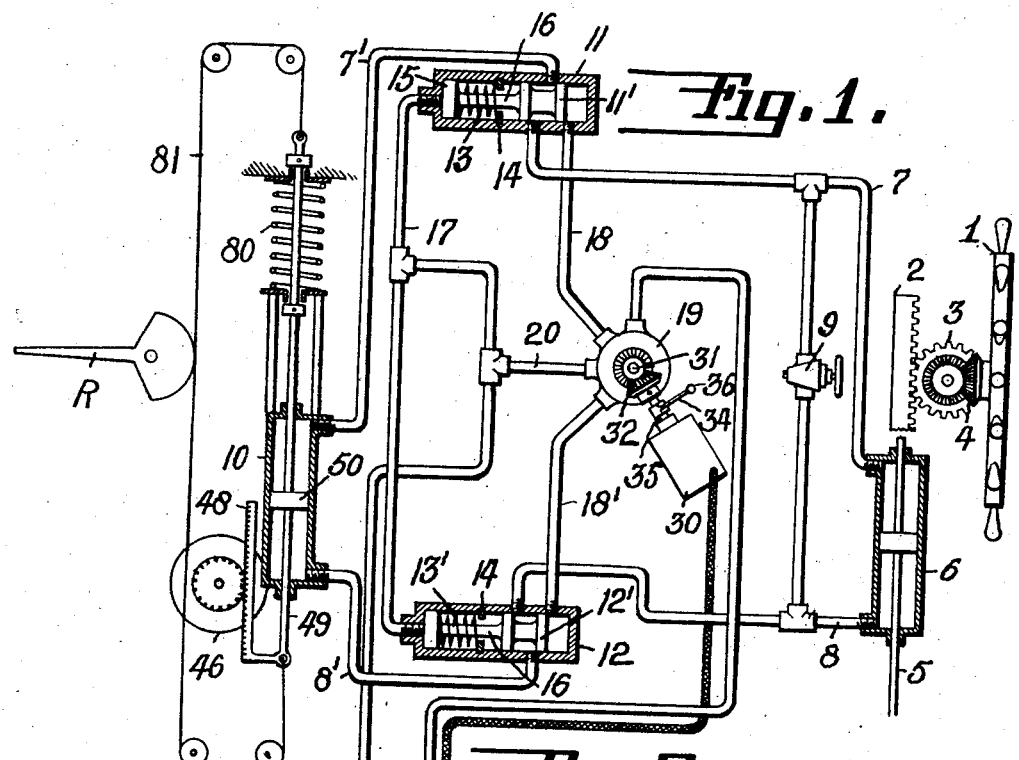
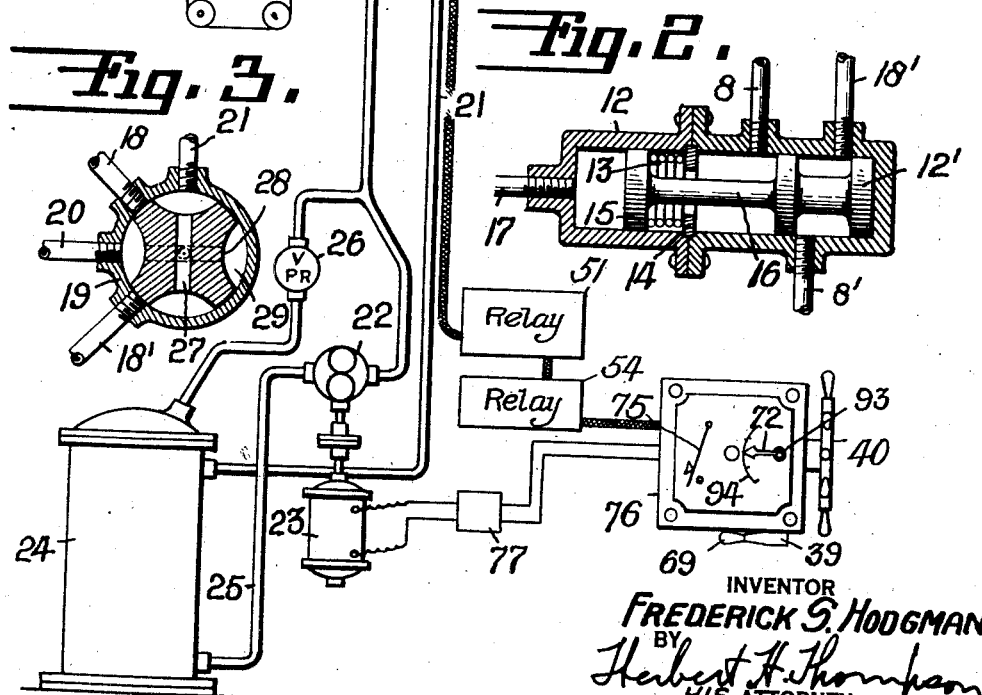
INVENTOR
FREDERICK S. HODGMAN
BY
Herbert H. Thompson
HIS ATTORNEY.

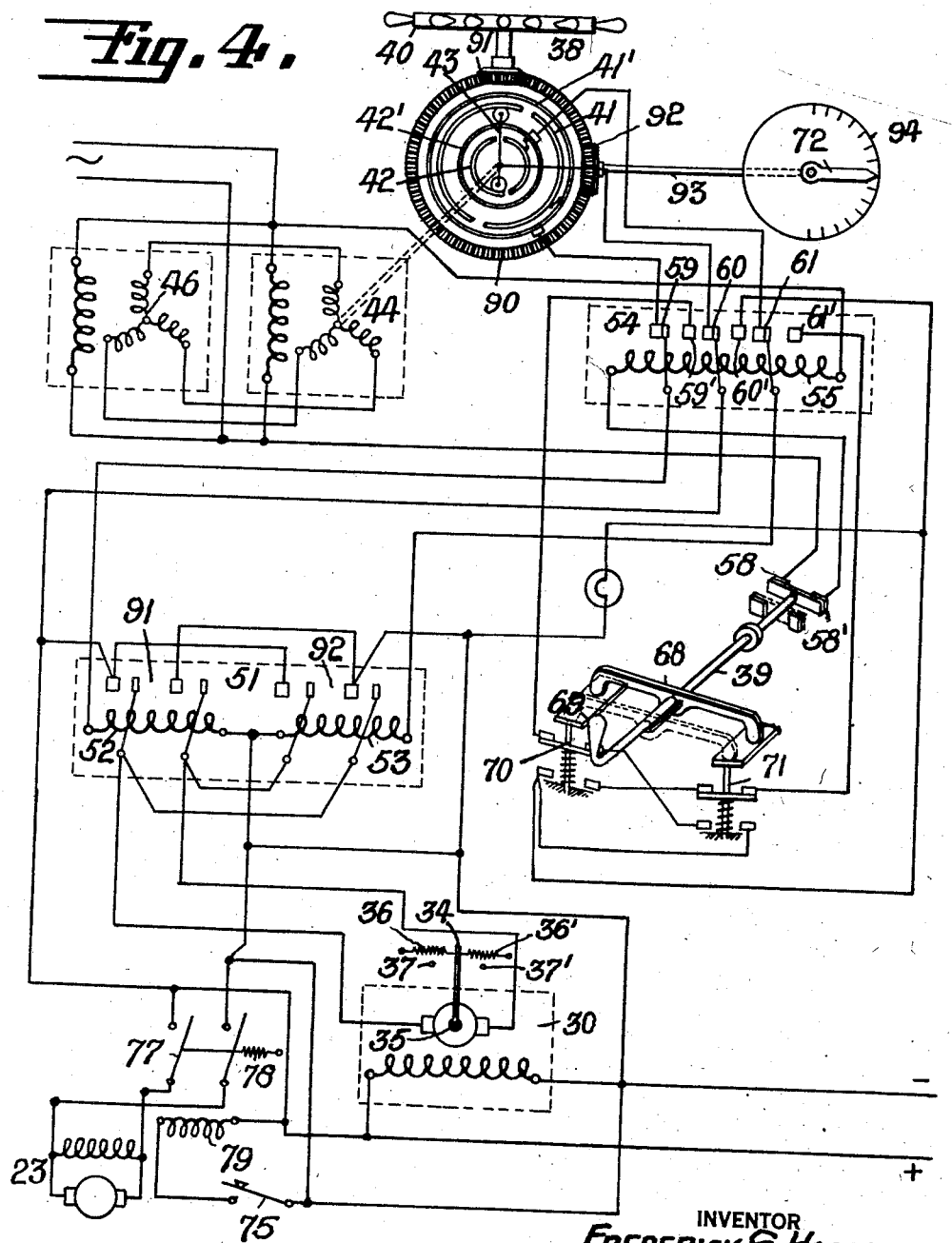

Patented Oct. 10, 1939

2,175,800

UNITED STATES PATENT OFFICE 2,175,800

ELECTROHYDRAULIC STEERING GEAR

Frederick S. Hodgman, Glen Rock, N. J., assignor to Sperry Gyroscope Company, Inc., Brooklyn, N. Y., a corporation of New York Application January 14, 1937, Serial No. 120,482
Renewed March 2, 1939

10 Claims. (Cl. 114—144)

This invention relates to hydraulic or combined electro-hydraulic steering gear for ships and other dirigible vehicles.

The standard steering system for many ships consists of two hydraulic telemotor units, one at the forward end and one at the after end, connected by long piping, the forward end being actuated directly from the main pilot wheel which operates the after end by transmission of f'uid pressure through the connecting pipes. This system has the advantages of simplicity and direct operation between the two units, but it also has the disadvantages of requiring considerable effort to operate, requiring extensive piping and being subject to loss of synchronism by leakage of fluid and ingress of air.

According to my invention, I propose to supplement such a standard hydraulic telemotor steering by an electro-hydraulic system which parallels the hydraulic system from the pilot house to the after end, but which preferably makes use of the after telemotor unit for operating the rudder either directly or through the usual steering engine. According to my system, I provide an auxiliary oil pump at the after end to supply the fluid pressure necessary for moving the rudder when operating through the electric steering wheel and also provide a pair of throw-over valves to cut in and out the hand telemotor and power system alternatively so that either may be used, but when one is in use the other system is locked out.

My system is also readily adapted for automatic steering for ships, since the form of controller in use at the pilot house is readily adapted for automatic steering uses.

My invention contains certain improvements over the electro-hydraulic system shown in my prior application Serial No. 83,216, filed June 3, 1936.

Referring to the drawings,

Fig. 1 is a diagrammatic view showing my invention applied to the usual ship's telemotor system.

Fig. 2 is a longitudinal section of one of the throw-over valves in a position different from that shown in Fig. 1.

Fig. 3 is a transverse section through the master control valve operated from the electric steering wheel.

Fig. 4 is a simplified wiring diagram of the electric steering gear.

As explained above, the usual ship's telemotor steering system comprises a pilot wheel 1 which operates usually one or more vertical racks 2 through pinion 3 and bevel gears 4. In this case the rack 2 is shown as connected to the piston rod 5 of a hydraulic cylinder 6, one end of which is connected to a pipe 7 and the other end to a pipe 8 leading aft to the after telemotor unit. A by-pass valve 9 is shown for the purpose of synchronizing or throwing out the forward unit. Usually the pipes 7 and 8 lead directly to the after cylinder or cylinders 10, the piston 50 of which is centralized by spring 80 and is connected to the rudder R or to the valves of the steering engine through cables or other mechanical linkage 81. According to my invention, I lead the pressure fluid first through a pair of throw-over valves 11 and 12 located in pipes 7 and 8, respectively. With the piston valves 11' and 12' in the positions shown, the pressure fluid from the cylinder 6 passes through the valves and on to the actuating cylinder 10 through pipes 7' and 8'. Normally, the piston valves 11', 12' are held in the position shown in Fig. 1 by compression springs 13 and 13', which bear at one end against the fixed interior collar or ring 14 in each cylinder and at the other end against an outer piston 15 secured to the stem 16 of said valve. In case, however, fluid under pressure is admitted through pipe 17 into the left hand end of cylinders 11 and 12, each piston valve will be forced to the right to compress said springs, as shown in Fig. 2, in which position the ports communicating with pipes 7 and 8 are shut off, and at the same time the pipes 7' and 8' are respectively connected to pipes 18 and 18' connected with a rotary master valve 19 controlled from the electric steering wheel.

Said master valve is shown as having, in addition to ports communicating with pipes 18 and 18', two ports communicating respectively with pipes 20 and 21 leading to the pressure and return side, respectively, of a hydraulic pump 22, shown as driven from an electric motor 23. Said pump draws its fluid from a sump or reservoir 24 through a pipe 25. A by-pass pressure regulating relief valve 26 regulates the pressure supplied by the pump to the system, returning or by-passing to the sump excess fluid not required for the operation of the system.

The valve is shown as of the rotary, balanced type turnable into any one of three positions: (1) in which the pump pressure from pipe 20 and the return to pipe 21 are both cut off, as shown in Fig. 3; (2) in which the valve is rotated clockwise through about 20°, thus connecting the pressure pipe 20 to pipe 18 so that pressure is supplied through valve 11 and pipe 7' to the upper end of cylinder 10 to the rudder to turn the rudder in a counter-clockwise direction from the position shown in the drawings. At the same time the return side is connected to the pipe 18' and thence to pipe 8' through the transverse channel 27 through the center of the rotatable valve. (3) In the third position the valve is rotated in a counter-clockwise direction about 20° from the position shown in Fig. 3, to connect pressure pipe 20 to pipe 18' so that pressure is supplied to the lower end of cylinder 10 to move the rudder in the other direction. At the same time the return side of the line 21 is connected to the pipe 18 through the passage 27. There is also shown an axially spaced passage 28 through the valve, leading to a closed chamber 29, so that the valve is balanced in all positions.

The valve is positioned in its several positions from an electro-magnetic device, shown as in the form of a motor 30, the shaft of which is geared to the shaft 31 of the valve through bevel gearing 32. The movements of the motor shaft are, however, limited in both directions so that the valve will only be turned through the correct angles, and the armature is normally centralized by a stiff spring or springs. Preferably the motor is constructed as shown in detail in my prior application Serial No. 83,216, for Electro-hydraulic telemotors, filed June 3, 1936. In this application I have merely represented this construction by showing an arm 34 secured to the motor shaft 35 and centralized on each side by compression springs 36 and 36', and limited in its movement by fixed stops 37 and 37' (Fig. 4). The motor shaft is normally centralized so that the valve 19 is in the position shown in Fig. 3, which is the standstill position of the rudder, but movement of the motor shaft in one direction or the other causes movement of the rudder, as explained above.

The motor 30 is preferably controlled from a controller or controllers 38 and/or 39, preferably adjacent the main pilot wheel 1. The controller 38 is shown as of the follow-up type and is actuated by a small pilot or trick wheel 40 which is shown as rotating the split contact rings 41 and 42 which control the motor 30. Said contact rings together with their slip rings 41' and 42' are shown as mounted on the face of a large bevel gear 90 with which a bevel pinion 91 on the shaft of hand wheel 40 meshes. The revolving brushes or trolley arm 43 of said contacts is shown as rotated from a repeater motor 44, said motor, in turn, being actuated by a transmitter 46 driven directly or indirectly from the rudder or the telemotor 10 actuating the same. As shown, the transmitter is driven from a rack bar 48 secured to the piston rod 49 of the piston 50 within the cylinder 10, the transmitter and motor being shown as of the A. C. self-synchronous type and making not more than one-half complete turn for a hard-over to hard-over rudder movement.

The controller is shown as operating the motor 30 through a relay 51, the controller indirectly energizing one or the other of the coils 52 and 53 thereon to close one or the other of pairs of contacts 91' or 92' to send current through the armature of the motor 30 in one direction or the other. The leads from the controller, however, are first carried through a magnetically operated switch 54, which is normally held closed as long as the A. C. supply for the self-synchronous transmitter 46 and motor 44 does not fail. The winding 55 thereof is in circuit with said supply and holds contacts 59, 60 and 61 normally closed.

In case this supply fails, however, the biased contacts 59, 60 and 61 open, thus disconnecting the follow-up controller 41 and connecting an auxiliary hard-over controller 39 by closing back contacts 59', 60' and 61'. The operator may then steer through said hard-over controller 39, which is shown in the form of a push rod having a handle 69, a cross arm 68, and a bridging contact which, in the position shown in the drawings, close a circuit between the contacts 58 and 58' placed between one of the A. C. supply leads and the coil 55.

The cross arm 68 is in operative position over a pair of spring biased reversing switches 70 and 71 which are in circuit with back contacts 59', 60' and 61' on the relay 54, which contacts are closed when the contacts 59, 60 and 61 are opened. It will readily be seen, therefore, that by rocking the handle 69 in one direction or the other, the motor 30 will be operated in the same manner as from the follow-up contacts. Since there is no follow-back connection, the rudder will therefore be run over when one of contacts 70 or 71 is held down as long as the contact is depressed and until its limit is reached, such limit being the limiting movement of piston 50 in cylinder 10. It is also obvious that the operator may assume control with the hard-over controller 39 at any time desired by merely pulling out the push rod, which will break the circuit to coil 55 and thereby disconnect the follow-up controller and render the hard-over controller operative. The follow-up controller is shown as having thereon a controller position indicating pointer 72 driven from large bevel gear 90 through bevel pinion 92 and shaft 93. Said pointer is readable on a fixed scale 94.

The pump 22 is also preferably controlled from a switch 75 on the electric controller stand 76. Said switch preferably controls the motor through a relay switch 77 normally biased to an open position by spring 78, the switch operating to close a circuit through solenoid 79, which holds the switch closed as long as current is flowing therethrough. In case, however, the switch 75 is opened or in case of failure of the main D. C. supply to the relay circuits and reversing motor 30, the switch 77 will open, thus stopping the motor 23. Stoppage of the motor will of course stop the pump 22, resulting in the valves 11 and 12 being returned to the position shown in the drawings, thus disconnecting the electric system and restoring full hydraulic control from the main steering wheel 1 and forward telemotor 6.

By my present system, therefore, I secure all the advantages of electric steering and at the same time retain the reliability of the hydraulic telemotor system by providing an automatic throw-over from the electric to the hydraulic telemotor system in case of failure of the electric system. In addition, I provide two alternative electric controls, so that the hard-over controller may be used in case of failure of the follow-up controller, or at any time desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Thus, in case the ship on which my invention is applied were equipped with an automatic pilot, the controller 38 would become the standard controller on the automatic pilot, such as shown in Fig. 5 of the prior patent to Chester B. Mills, #1,695,601, dated December 18, 1928, the contact rings in this instance being turned differentially from the compass repeater motor and the trick wheel 40.

Having described my invention, what I claim and desire to secure by Letters Patent is:

1. A dual hydraulic steering gear for ships, the combination with a manually powered hydraulic system including a forward telemotor unit and pilot wheel and an after telemotor unit, an auxiliary pilot wheel, a power driven pump, means for disconnecting said forward from said after unit and for connecting said pump to drive said after unit, a triple valve for governing said unit from the pump to drive the former in one direction or the other or to stand still, and electrical means actuated by said auxiliary pilot wheel for positioning said valve in any of its three positions.

2. An auxiliary electrical control for hydraulic telemotor steering gears as claimed in claim 1, having an electrical follow-back connection from the after telemotor unit to said electrical means at said auxiliary pilot wheel.

3. A dual hydraulic steering gear for ships, the combination with a manually powered hydraulic system including a forward telemotor unit and pilot wheel and an after telemotor unit, an auxiliary pilot wheel, an electrical controller operated thereby, a power driven pump for auxiliary operation of said after telemotor unit, and means for governing the supply of fluid pressure from said pump by said controller to actuate the rudder to steer the ship.

4. An auxiliary electrical control for hydraulic telemotor steering gears as claimed in claim 3, having automatic means for throwing out the auxiliary steering system on failure of pump pressure.

5. In an electrical steering gear for ships, a follow-up electrical controller, a steering motor, a self-synchronous electrical transmission from said motor to said controller, a hard-over electrical controller, and automatic means for transferring the control of said steering motor from said follow-up to said hard-over controller responsive to failure of said self-synchronous transmission.

6. In an electro-hydraulic telemotor, a controlling member, a controlled member, a hydraulic servo motor for determining the movement of said controlled member, valve means for regulating the supply of pressure operating fluid to said servo motor, a remote control electric circuit including motive means for operating said valve means, said circuit comprising contact means actuated from said controlling member for determining the operation of said motive means, an electrical repeat-back connection between said servo motor and said contact means, and an alternative manually operated telemotor for operating said servo motor directly.

7. In an electro-hydraulic steering system, the combination with a manually powdered hydraulic system including a forward telemotor unit and pilot wheel and an after telemotor unit normally connected together, a power driven pump for auxiliary operation of said after telemotor unit, and automatic means in the connections between said forward and after telemotor units for disconnecting the latter from the former and connecting the latter to said pump upon establishment of working pump pressure.

8. A duel hydraulic steering gear for ships, the combination with a manually powered hydraulic system including a forward telemotor unit and pilot wheel and an after telemotor unit, an auxiliary pilot wheel, a powder driven pump, valve means for disconnecting said forward from said after unit and for connecting said pump to drive said after unit, a second valve for governing said unit from the pump to drive the former in one direction or the other, and means actuated by said auxiliary pilot wheel for positioning said valve in any of its positions.

9. In an electro-hydraulic steering system, the combination with a manually powered hydraulic system including a forward telemotor unit and pilot wheel and an after telemotor unit normally connected together, a power driven pump for auxiliary operation of said after telemotor unit, automatic means in the connections between said forward and after telemotor units for disconnecting the latter from the former and connecting the latter to said pump upon establishment of working pump pressure, and an auxiliary pilot wheel for controlling the application of pump pressure to said after telemotor.

10. Apparatus for the distant dual positional control of the rudder of a dirigible craft, comprising a manually controllable hydraulic system including a forward telemotor unit and pilot wheel and an after telemotor unit serving to actuate the rudder, normally connected to said forward unit, a powder driven hydraulic pump, an auxiliary control device adjacent said pilot wheel, and valve means adjustable therefrom for disconnecting the said after unit from the forward unit and connecting the after unit to said pump, whereby said after unit may be controlled from said auxiliary device.

FREDERICK S. HODGMAN.